United States Patent
Moss

(10) Patent No.: US 9,092,787 B2
(45) Date of Patent: Jul. 28, 2015

(54) SEGMENTED QUESTIONNAIRE VALIDATION OF BUSINESS RULES BASED ON SCORING

(75) Inventor: Harold Moss, Danvers, MA (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 11/470,377

(22) Filed: Sep. 6, 2006

(65) Prior Publication Data

US 2008/0059520 A1    Mar. 6, 2008

(51) Int. Cl.
| | |
|---|---|
| G06F 11/34 | (2006.01) |
| G06Q 30/02 | (2012.01) |
| G06Q 30/00 | (2012.01) |
| G06Q 30/06 | (2012.01) |
| G06Q 10/06 | (2012.01) |

(52) U.S. Cl.
CPC .............. *G06Q 30/02* (2013.01); *G06Q 10/06* (2013.01); *G06Q 30/018* (2013.01); *G06Q 30/0639* (2013.01)

(58) Field of Classification Search
USPC ......................................................... 707/104
See application file for complete search history.

(56) References Cited

U.S. PATENT DOCUMENTS

| | | | | |
|---|---|---|---|---|
| 5,890,139 | A | 3/1999 | Suzuki et al. | 705/27 |
| 6,175,833 | B1 | 1/2001 | West et al. | 707/102 |
| 7,054,876 | B2 * | 5/2006 | Yanase et al. | 707/101 |
| 7,233,908 | B1 * | 6/2007 | Nelson | 705/10 |
| 7,607,164 | B2 * | 10/2009 | Vasishth et al. | 726/1 |
| 7,945,467 | B2 * | 5/2011 | Moss | 705/7.38 |
| 2007/0202483 | A1 * | 8/2007 | Castelli et al. | 434/350 |

OTHER PUBLICATIONS

Curt Finch, Projects @ Work, Jan. 16, 2006, p. 1.*

* cited by examiner

*Primary Examiner* — Albert Phillips, III
(74) *Attorney, Agent, or Firm* — Terrile, Cannatti, Chambers & Holland, LLP; Stephen A. Terrile

(57) ABSTRACT

A method, system and computer-usable medium for a policy validator that automates the validation of existing or proposed policies. A segmented questionnaire wizard is implemented to guide a policy creator through a series of policy-related questions, resulting in the automated generation of a questionnaire used for validating the policy. The resulting validation questionnaire is automatically distributed to predetermined subject matter experts and individuals affected by the policy, whose responses are then analyzed and scored by the policy validator to determine the validity of the policy. If the resulting validation score is within a predetermined, acceptable range, the policy is approved and released for implementation. Otherwise, the process is repeated until an acceptable validation score is achieved.

15 Claims, 4 Drawing Sheets

SEGMENTED QUESTIONNAIRE VALIDATION OF BUSINESS RULES BASED ON SCORING

BACKGROUND OF THE INVENTION

The present invention relates in general to the field of computers and other data processing systems, including hardware, software, and processes. More specifically, the present invention relates to automated validation of policies.

Many of today's business policies are put into effect as the result of internal or external events instead of business, market or economic drivers. Whether their genesis is internal, external, or both, they are often mandated by parties that demand their enforcement, but may not be aware of their potential to contradict or conflict with other compliance mandates. In some cases, existing internal policies not only conflict with or contradict current laws, regulations, or policies, they place the organization at legal or financial risk. In other cases, new policies are put into effect that unwittingly offset, conflict with, or undermine existing policies.

While policies can be collaboratively created or modified, their validation may be limited by a number of factors, including but not limited to, awareness and knowledge of overriding government legislation or industry rules. This situation can become further exacerbated when subject matter experts have either not been identified or consulted to establish the viability or ramifications of their enactment and enforcement. In some situations, the proper knowledge resources exist within the organization, but the policy makers are unaware of their existence. In other situations, best efforts are made to identify and seek advice from the most appropriate and knowledgeable resources, only to inadvertently ask questions that lack relevancy.

As a result, there is an increased likelihood of establishing ineffective, counterproductive, or unenforceable policies, all due to the fact that proposed policies have not been properly validated. Current approaches attempt to address different aspects of these issues, yet the underlying issue of identifying and maximizing the use of the most suitable knowledge resource possible remains unaddressed. In view of the foregoing, there is a need for automatically identifying the most appropriate and knowledgeable subject matter experts within an organization and presenting proposed policies for their review, feedback and validation prior to their approval.

SUMMARY OF THE INVENTION

The present invention includes, but is not limited to, a method, apparatus and computer-usable medium for the automated validation of existing or proposed policies. In various embodiments of the invention, a policy validator is implemented, comprising a segmented questionnaire wizard that guides a policy creator through a series of policy-related questions. By answering the questions, the policy creator is guided through a policy creation process that results in the automated generation of a questionnaire that is used for validating the policy. Once generated, the validation questionnaire is automatically distributed to predetermined subject matter experts and individuals affected by the policy. Responses to the questionnaire are then analyzed and scored by the policy validator to determine the validity of the policy.

In an embodiment of the invention, the policy exists and the policy validator is implemented to verify its validity. If the policy is found to lack validity, it can be revised, revalidated, and released for implementation. In another embodiment of the invention, the policy is proposed and the policy validator is implemented to predetermine its validity such that it can be revised as necessary prior to being approved and released for implementation.

In various embodiments of the invention, the policy validator comprises a policy definition tool, which further comprises a business rules system for creating an abstract of a proposed policy and a target list of questionnaire reviewers who are most affected by the policy. In one embodiment of the invention, a predetermined percentage of the reviewers on the target list are randomly selected to receive the questionnaire. When responses from the questionnaire reviewers are received, the business rules system is implemented by the policy validator to score the responses using weighted assignments correlated to internal business and external regulatory mandates. If the resulting validation score is within an acceptable range, the policy is approved and released for implementation. If not, the policy is revised within constraints imposed by the business rules system and new questionnaires are generated, distributed, responded to, and scored until an acceptable validation score is achieved. The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
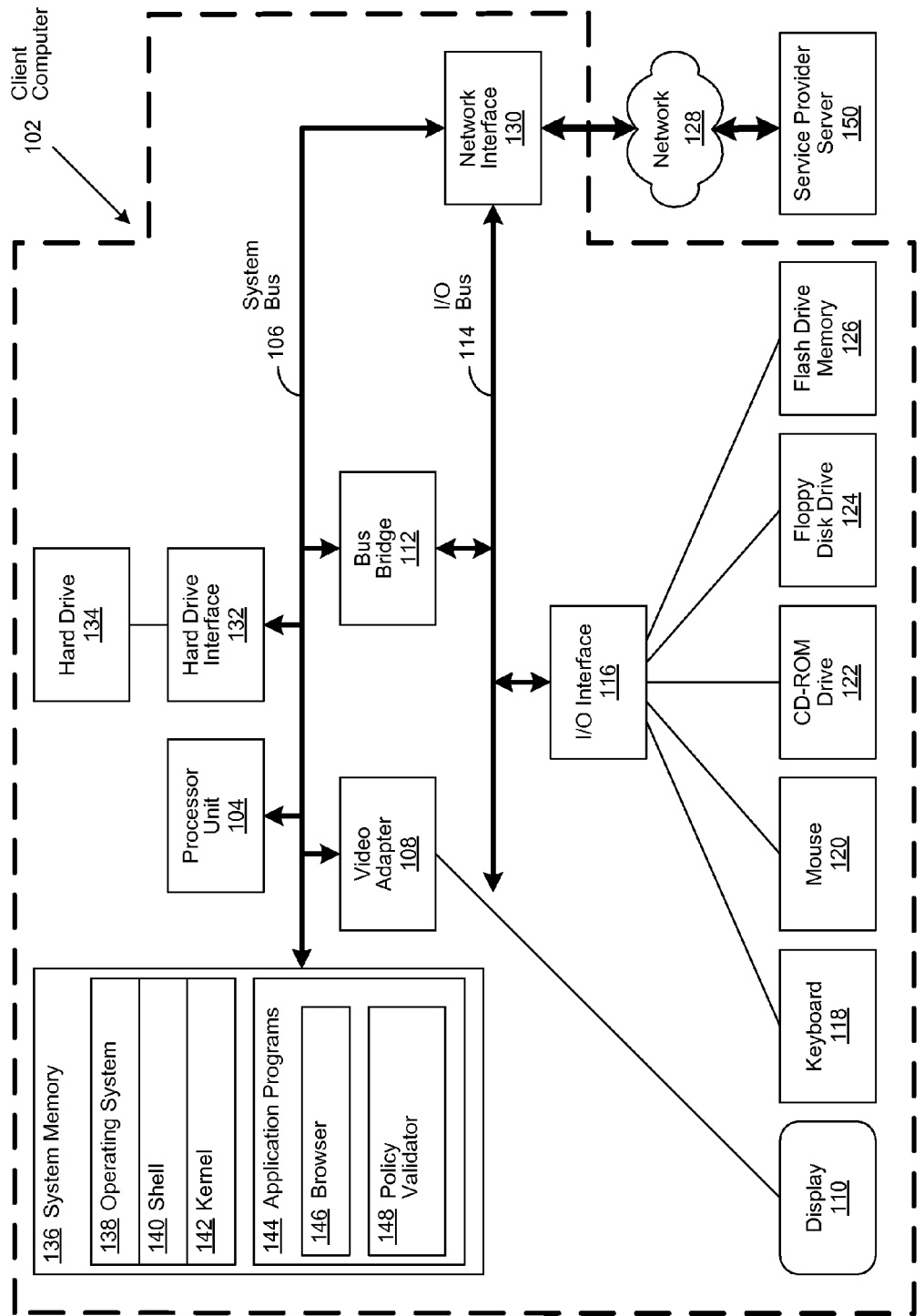
FIG. 1 illustrates an exemplary client computer in which the present invention may be implemented.

A method, system and computer-usable medium are disclosed for a policy validator to provide automated validation of existing or proposed policies. In various embodiments of the invention, a segmented questionnaire wizard is implemented to guide a policy creator through a series of policy-related questions that result in the automated generation of a questionnaire used for validating the policy. The resulting validation questionnaire is automatically distributed to predetermined subject matter experts and individuals affected by the policy, whose responses are then analyzed and scored by the policy validator to determine the validity of the policy.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 150 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 150.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer 102's operating system (OS) 138 and application programs 144.

OS 138 includes a shell 140 for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and application programs 144, including memory management, process and task management, disk management, and mouse and keyboard management.

Application programs 144 may include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 150.

Application programs 144 in client computer 102's system memory also include a policy validator 148. Policy validator 148 includes code for implementing the processes described in FIGS. 2-4 described hereinbelow. In one embodiment, client computer 102 is able to download policy validator 148 from a service provider server 150.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
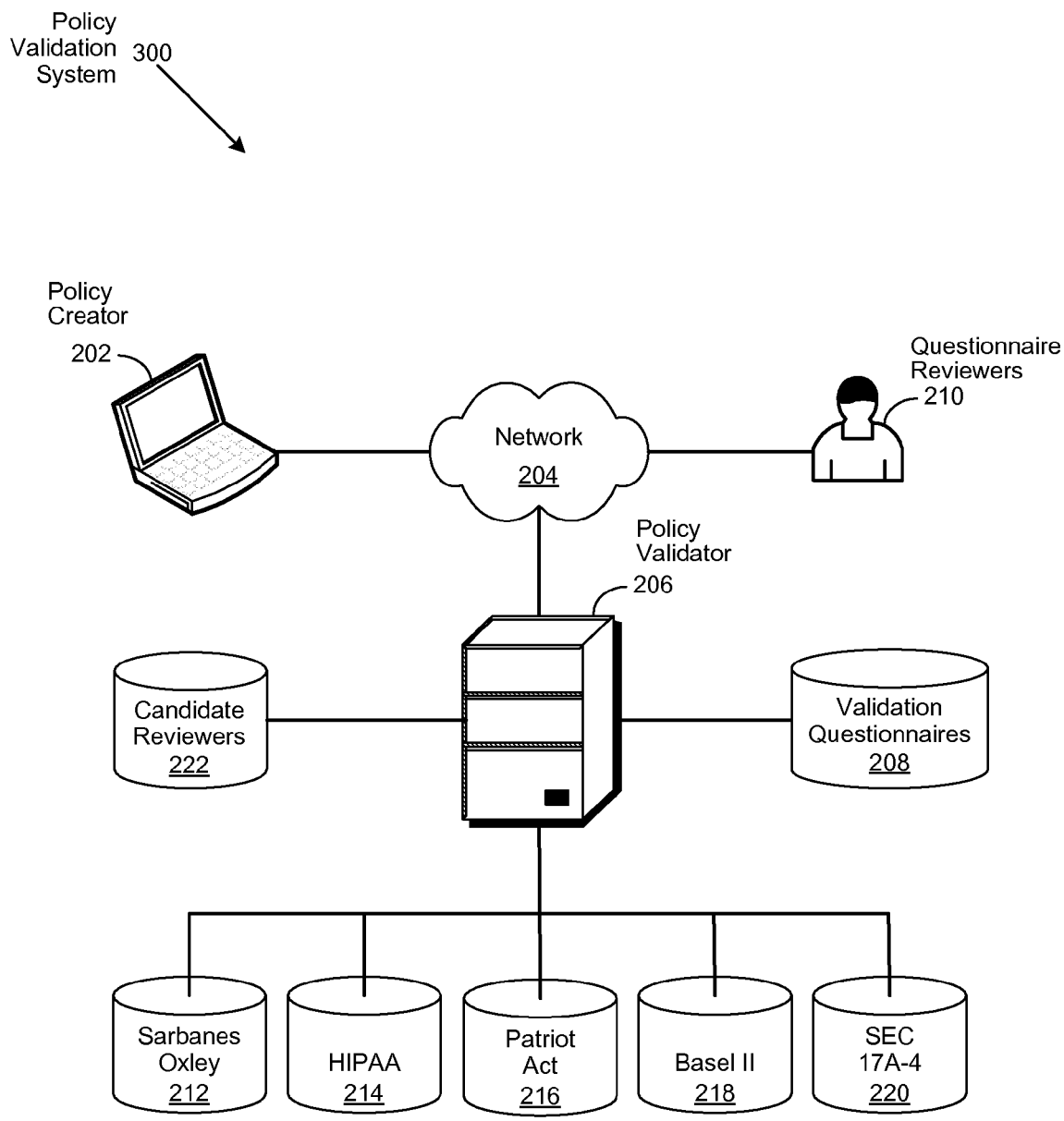
FIG. 2 is a generalized block diagram depicting a policy validation system as implemented in accordance with an embodiment of the invention.

FIG. 2 is a generalized block diagram of a policy validation system 200 as implemented in accordance with an embodiment of the invention. In this embodiment of the invention, policy creator 202 accesses policy validator 206 through network 204 to create one or more validation questionnaires 208. In various embodiments of the invention, policy validator 206 comprises a validation questionnaire wizard that guides policy creator 202 through a series of policy-related questions. By answering the questions, policy creator 202 is guided through a policy creation process that results in the automated generation of questionnaires 208 that are used for validating the policy.

Questionnaires are created by referencing guidelines comprising one or more policy repositories such as, but not limited to, Sarbanes-Oxley repository 212, Health Information Portability and Accountability Act (HIPAA) repository 214, Patriot Act repository 216, Basel II repository 218, or SEC 17A-4 repository 220. Those of skill in the art will be familiar with the Sarbanes-Oxley Act, which addresses corporate fraud, and the Health Information Portability and Accountability Act (HIPAA), that is intended to improve the privacy and security of patient's medical information. Skilled practitioners of the art will likewise be familiar with the Patriot Act that was enacted to counter a broad range of terrorist threats, the Basel II 218 that establishes standards for measuring the adequacy of a bank's capital, and the SEC 17A-4 220 legislation for the secure electronic storage of securities trading records. Once created, validation questionnaires 208 are electronically distributed, typically through network 204, to one or more predetermined questionnaire reviewers 310. Questionnaire reviewers may include, but are not limited to, policy makers or enforcers chosen from candidate reviewers 222.

Responses from questionnaire reviewers 210 to validation questionnaires 208 are aggregated, analyzed and scored by policy validator 206 to determine the validity of the policy. In an embodiment of the invention, the policy exists and policy validator 206 is implemented to verify its validity. If the policy is found to lack validity, it can be revised, revalidated, re-approved, and released for implementation. In another embodiment of the invention, the policy is proposed and policy validator 206 is implemented to predetermine its validity such that it can be revised as necessary prior to being approved and released for implementation.

Figure 3:
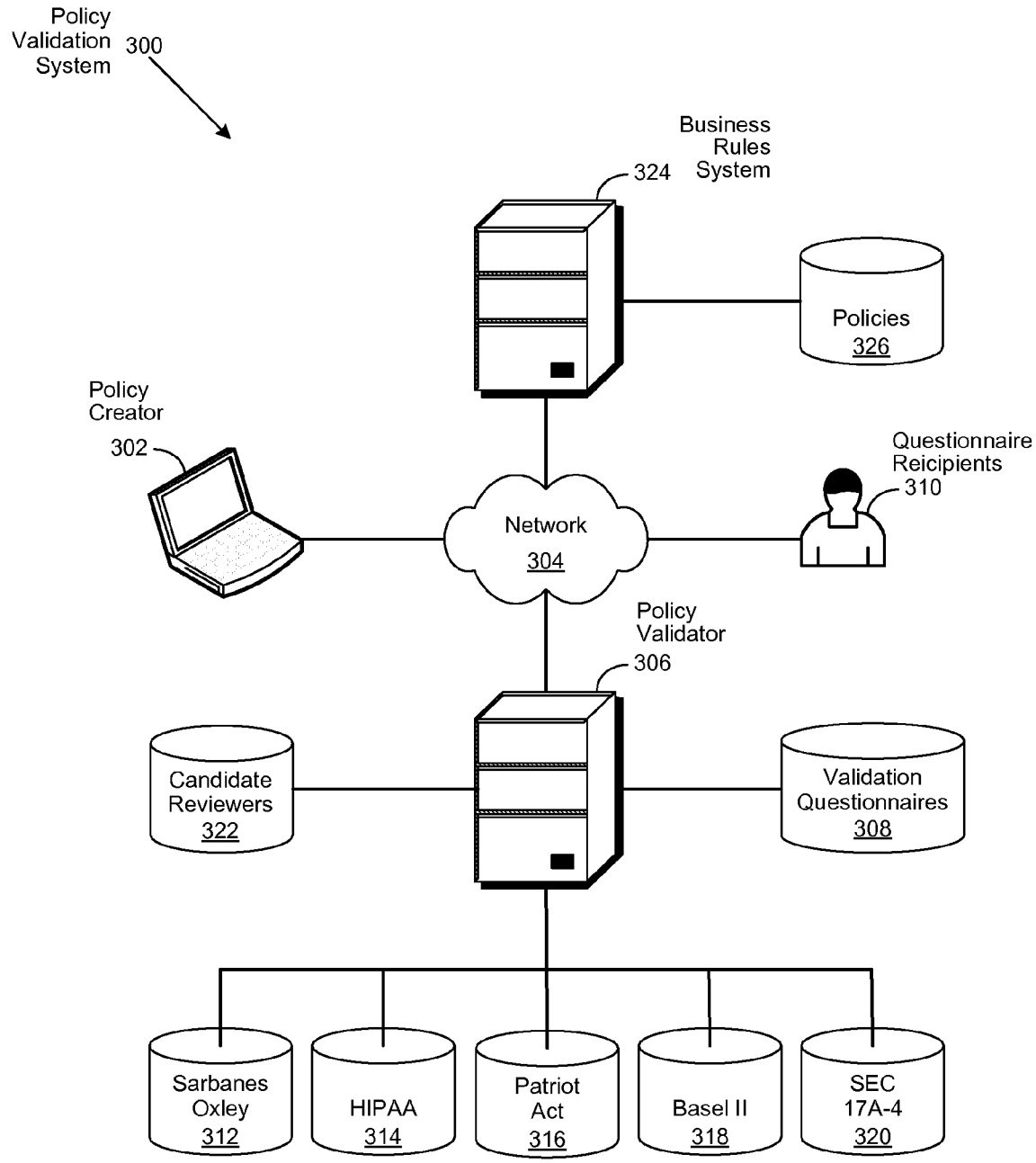
FIG. 3 is a generalized block diagram depicting a policy validation system as implemented with a business rules system in accordance with an embodiment of the invention.

FIG. 3 is a generalized block diagram of a policy validation system 300 as implemented with a business rules system 324 in accordance with an embodiment of the invention. In this embodiment of the invention, policy creator 302 accesses policy validator 306 through network 304 to create one or more validation questionnaires 308. In different embodiments of the invention, policy validator 306 comprises a validation questionnaire wizard that guides policy creator 302 through a series of policy-related questions. By answering the questions, policy creator 302 is guided through a policy creation process that results in the automated generation of questionnaires 308 that are used for validating the policy. Questionnaires are created by referencing guidelines comprising one or more policy repositories such as, but not limited to, Sarbanes-Oxley, HIPAA, the Patriot Act, Basel II, or SEC 17A-4 320 discussed above. Once created, validation questionnaires 308 are electronically distributed, typically through network 304, to one or more predetermined questionnaire reviewers 310 such as, but not limited to, policy makers or enforcers. Responses from questionnaire reviewers 310 to validation questionnaires 308 are aggregated, analyzed and scored by policy validator 306 to determine the validity of the policy.

In this embodiment of the invention, policy validator 306 comprises a policy definition tool further comprising business rules system 324 for creating an abstract of a proposed policy 326 and a target list of questionnaire reviewers 322 who are most affected by the policy. In an embodiment of the invention, a predetermined percentage of the target list of candidate reviewers 322 generated by business rules system 324 is randomly selected to receive the questionnaire. When responses from the questionnaire reviewers 310 are received, the business rules system is used by policy validator 306 to score the responses based on weighted assignments correlated to internal business and external regulatory mandates. If the resulting validation score is within an acceptable range, the policy 326 is approved and released for implementation. If not, the policy 326 is revised in accordance with constraints imposed by the business rules system 324 and new validation questionnaires 308 are generated, distributed, responded to, and scored until an acceptable validation score is achieved.

Figure 4:
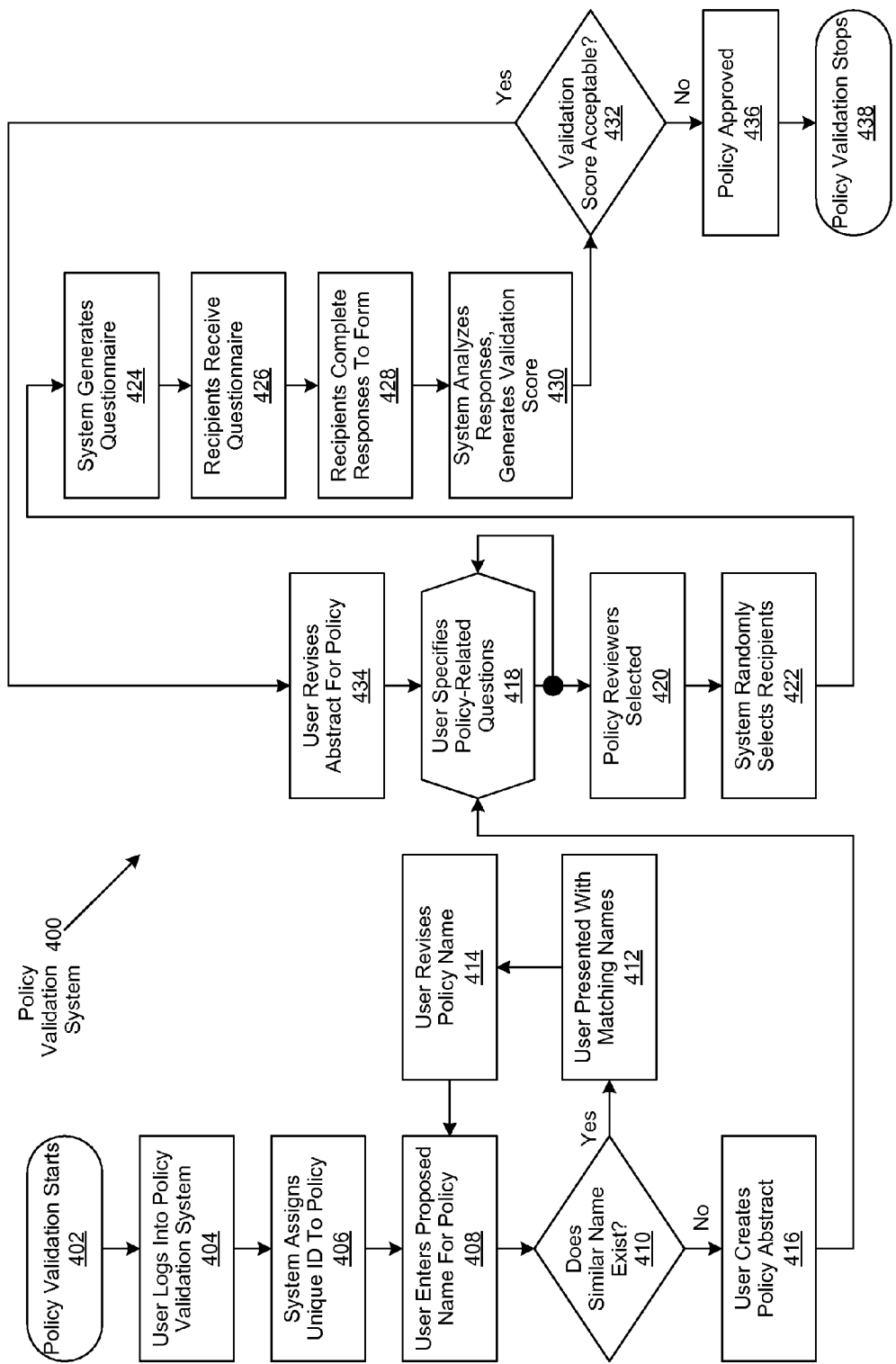
FIG. 4 is a generalized flowchart of policy validation system as implemented in accordance with an embodiment of the invention.

FIG. 4 is a generalized flowchart of an embodiment of a policy validation system 400 as implemented in accordance with an embodiment of the invention. Validation of a policy starts in step 402 with a user logging-in to the policy validation system in step 404. The policy validation system assigns a unique identifier (ID) to the policy and the user enters a proposed name for the policy in step 408. Similar policy names are checked for by the policy validation system in step 410 and, if found, are presented to the user in step 412. The user revises the policy name in step 414 and submits the revised name in step 408, repeating the process until a unique name is found in step 410. Once a unique policy name is found in step 410, the user creates a policy abstract in step 416 and specifies policy related questions in step 418 to construct a validation questionnaire.

Once the validation questionnaire is completed, a candidate list of policy reviewers are selected in step 420. In an embodiment of the invention, the policy validation system selects the candidate list of reviewers based on criteria chosen by the user. In another embodiment of the invention, the candidate list of reviewers is selected based on the implementation of a business rules system comprising the policy validation system. In step 422, a random subset of the candidate list is selected by the policy validation system, which then generates a validation questionnaire in step 424 for delivery to the chosen reviewers in step 426. The chosen reviewers complete the validation questionnaires in step 428, which are then analyzed and scored by the policy validation system in step 430. If it is determined in step 432 that the resulting validation score is within a predetermined, acceptable range, the policy is approved and released for implementation in step 436 and policy validation stops in step 438. Otherwise, the user revises the abstract of the policy in step 434 and specifies appropriate policy related questions in step 418 with the process repeating until it is determined in step 432 that the resulting validation score is within a predetermined, acceptable range. Once an acceptable validation score is achieved in step 432, the policy is approved and released for implementation in step 436 and policy validation stops in step 438.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:
creating, via a policy validator, a questionnaire relating to a policy, said questionnaire comprising a plurality of segmented questionnaires, each of the plurality of segmented questionnaires including a range of weighted responses, the policy validator comprising a segmented questionnaire wizard, the segmented questionnaire wizard guiding a policy creator through a series of policy-related questions, the series of policy-related questions guiding the policy creator through a policy creation process that results in an automated generation of the questionnaire that is used for validating the policy;
electronically distributing the questionnaire to a plurality of reviewers;
receiving responses from the plurality of reviewers to the questionnaire;
using the policy validator executing on a computer system to score the responses to the questionnaire to determine the validity of the policy, said policy validator comprising a business rules system operable to score the questionnaire based upon the range of weighted responses;
determining whether the score of the questionnaire is within an acceptable range;
approving release of the policy when the score is within the acceptable range;
using said policy validator to generate a revised questionnaire based on the scoring of said responses to said questionnaire;
electronically distributing the revised questionnaire to the plurality of reviewers;
receiving responses from the plurality of reviewers to the revised questionnaire; and
using the policy validator to score the responses to the revised questionnaire to determine the validity of the policy.

2. The computer-implementable method of claim 1 wherein:
said weighted response are correlated with regulatory mandates.

3. The computer-implementable method of claim 1 wherein:
the questionnaire is generated using policy control data stored in a regulatory data repository.

4. The computer-implementable method of claim 1 wherein:
said scored responses to the questionnaire are used to derive policy guidance parameters for modification of the policy.

5. A system comprising:
a processor;
a data bus coupled to the processor; and
a non-transitory computer-usable medium embodying computer program code, the computer-usable medium being coupled to the data bus, the computer program code comprising instructions executable by the processor and configured for:
creating a questionnaire relating to a policy via a policy validator, said questionnaire comprising a plurality of segmented questionnaires, each of the plurality of segmented questionnaires including a range of weighted responses, the policy validator comprising a segmented questionnaire wizard, the segmented questionnaire wizard guiding a policy creator through a series of policy-related questions, the series of policy-related questions guiding the policy creator through a policy creation process that results in an automated generation of the questionnaire that is used for validating the policy;
electronically distributing the questionnaire to a plurality of reviewers;
receiving responses from the plurality of reviewers to the questionnaire;
using the policy validator to score the responses to the questionnaire to determine the validity of the policy, said policy validator comprising a business rules system operable to score the questionnaire based upon the range of weighted responses;
determining whether the score of the questionnaire is within an acceptable range;
approving release of the policy when the score is within the acceptable range;
using said policy validator to generate a revised questionnaire based on the scoring of said responses to said questionnaire,
electronically distributing the revised questionnaire to the plurality of reviewers;
receiving responses from the plurality of reviewers to the revised questionnaire; and
using the policy validator to score the responses to the revised questionnaire to determine the validity of the policy.

6. The system of claim 5, wherein:
said questionnaire includes a plurality of segmented questionnaires, each of the plurality of segmented questionnaires including a range of weighted responses; and
said policy validator further comprises a business rules system operable to score the questionnaire based upon the range of weighted responses.

7. The system of claim 6 wherein:
said weighted response are correlated with regulatory mandates.

8. The system of claim 5 wherein:
the questionnaire is generated using policy control data stored in a regulatory data repository.

9. The system of claim 5 wherein:
said scored responses to the questionnaire are used to derive policy guidance parameters for modification of the policy.

10. A non-transitory computer-usable medium embodying computer program code, the computer program code comprising computer executable instructions configured for:
creating a questionnaire relating to a policy via a policy validator, said questionnaire comprising a plurality of segmented questionnaires, each of the plurality of segmented questionnaires including a range of weighted responses, the policy validator comprising a segmented questionnaire wizard, the segmented questionnaire wizard guiding a policy creator through a series of policy-related questions, the series of policy-related questions guiding the policy creator through a policy creation process that results in an automated generation of the questionnaire that is used for validating the policy;

electronically distributing the questionnaire to a plurality of reviewers;

receiving responses from the plurality of reviewers to the questionnaire; and using a policy validator to score the responses to the questionnaire to determine the validity of the policy, said policy validator comprising a business rules system operable to score the questionnaire based upon the range of weighted responses;

determining whether the score of the questionnaire is within an acceptable range; and, approving release of the policy when the score is within the acceptable range;

using said policy validator to generate a revised questionnaire based on the scoring of said responses to said questionnaire, electronically distributing the revised questionnaire to the plurality of reviewers;

receiving responses from the plurality of reviewers to the revised questionnaire; and using the policy validator to score the responses to the revised questionnaire to determine the validity of the policy.

11. The computer-usable medium of claim 10 wherein:
said weighted response are correlated with regulatory mandates.

12. The computer-usable medium of claim 10 wherein:
the questionnaire is generated using policy control data stored in a regulatory data repository.

13. The computer-usable medium of claim 12 wherein:
said scored responses to the questionnaire are used to derive policy guidance parameters for modification of the policy.

14. The computer-useable medium of claim 10, wherein the computer executable instructions are deployable to a client computer from a server at a remote location.

15. The computer-useable medium of claim 10, wherein the computer executable instructions are provided by a service provider to a customer on an on-demand basis.

* * * * *